United States Patent [19]
Yamada et al.

[11] Patent Number: 4,833,545
[45] Date of Patent: May 23, 1989

[54] RECEIVER SYSTEM OF IMAGE SIGNAL FROM WEATHER SATELLITE

[75] Inventors: Tuneo Yamada, Machida; Yuta Shinoki, Cyoufu, both of Japan

[73] Assignee: Kabushiki Kaisha Kenwood, Tokyo, Japan

[21] Appl. No.: 84,891

[22] Filed: Aug. 13, 1987

[30] Foreign Application Priority Data

Aug. 15, 1986 [JP] Japan ................................ 61-190421

[51] Int. Cl.$^4$ ............................................... H04N 1/40
[52] U.S. Cl. ..................................... 358/282; 358/280; 358/284
[58] Field of Search ................. 358/282, 281, 284, 280

[56] References Cited

U.S. PATENT DOCUMENTS

| | | | |
|---|---|---|---|
| 4,205,341 | 5/1980 | Mitsuya et al. | 358/282 X |
| 4,547,811 | 10/1985 | Ochi et al. | 358/280 |
| 4,554,593 | 11/1985 | Fox et al. | 358/282 |
| 4,577,235 | 3/1986 | Kannapell et al. | 358/280 |
| 4,593,325 | 6/1986 | Kannapell et al. | 358/282 |
| 4,654,721 | 3/1987 | Goertzel et al. | 358/284 X |

FOREIGN PATENT DOCUMENTS

| | | | |
|---|---|---|---|
| 0113016 | 7/1984 | European Pat. Off. | 358/280 |
| 56-116365 | 9/1981 | Japan | 358/280 |
| 58-82361 | 5/1983 | Japan | 358/280 |
| 60-51382 | 3/1985 | Japan | 358/280 |

OTHER PUBLICATIONS

"Guideline for Use of Stationary Weather Satellite Material" Mar., 1983, Weather Satellite Center.

Primary Examiner—James J. Groody
Assistant Examiner—E. Anne Faris
Attorney, Agent, or Firm—Gerald J. Ferguson, Jr.

[57] ABSTRACT

A receiver system receives an image signal from a weather satellite to display the weather condition in a display. The system produce a threshold level out of neighboring gray levels in the received signal and converts the subsequent image signal into lightness signals in dependence on the produced threshold levels.

5 Claims, 6 Drawing Sheets

RECEIVER SYSTEM OF IMAGE SIGNAL FROM WEATHER SATELLITE

BACKGROUND OF THE INVENTION

1. Field of the Invention

The present invention relates to a receiver system of an image signal from a weather satellite in which an image signal transmitted from a weather satellite is optimally converted into a lightness signal.

2. Related Background Art

Figure 8:
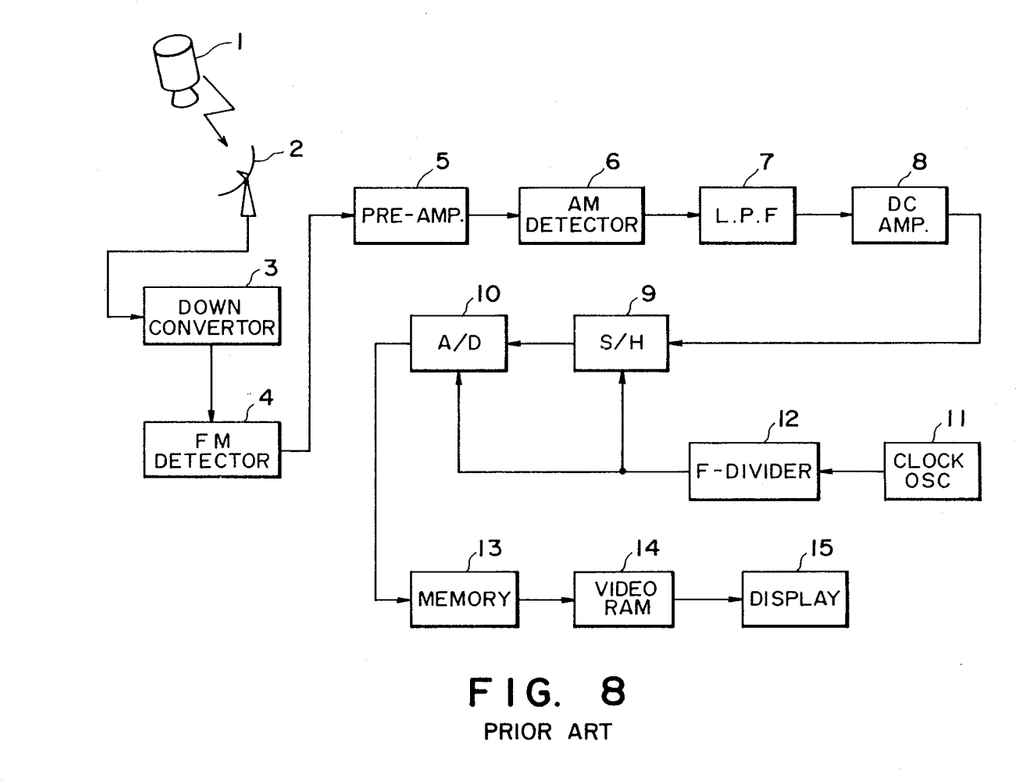
FIG. 8 is a block diagram showing a constitution of a conventional video signal satellite receiver system.

In a conventional receiver system of an image signal from a weather satellite, as shown in FIG. 8, an amplitude-frequency modulated image signal (hereinafter, referred to as a transmission image signal or FAX-facsimile signal) which is sent from a weather satellite 1 is received by a parabola antenna 2. The received signal is converted by a down converter 3 into a frequency signal which can be easily process. This frequency signal is FM detected by an FM detector 4 and amplified by a pre-amplifier 5. Thereafter, the amplified signal is AM detected by an AM detector 6. The AM detected output is applied to a DC amplifier 8 through a low pass filter 7 to remove carrier signal and is amplified to a voltage level necessary for A/D conversion. On the other hand, the clock signal generated from a clock signal oscillator 11 is frequency divided by a frequency divider 12.

An output from the DC amplifier 8 which represents quantized levels of the temperatures or lightness of a cloud image is sampled and held by a sample/hold (S/H) circuit 9. An output of the S/H circuit 9 is converted into digital data by an analog/digital converter (hereinafter, referred to as an A/D converter) 10. An output of the frequency divider 12 is supplied as a sampling clock signal and a conversion clock signal to the S/H circuit 9 and A/D converter 10.

The output data from the A/D converter 10 is supplied as address data to a memory 13 and converted into lightness data stored therein. This lightness data is stored into a video RAM 14 and an image is displayed by a display 15.

SUMMARY OF THE INVENTION

In the foregoing conventional example, a conversion table by which the FAX signal is converted into the lightness data is set to a fixed value. There is a problem such that even if the input level deviated due to the variation of the total gain or drift of offset level in the receiver or the like, the optimum conversion cannot be performed due to a deviation in input level or the like.

It is an object of the present invention to solve the foregoing problem.

This object is solved by a receiver system of an image signal from a weather satellite in which, for example, a middle level between adjacent gray levels in a gray scale signal inserted between an actuation signal (300 Hz, 3 seconds)—phase signal (5 seconds) and an image signal of an FAX signal transmitted is set to a threshold level, thereby making a conversion table in a memory, and the input FAX signal level is converted into a lightness signal by the conversion table made by use of the threshold level.

An image signal receiver system of the illustrated embodiment comprises: receiving means for receiving and demodulating an image signal transmitted from a weather satellite; an A/D converter for converting an output of the receiving means into a digital signal; first storage means in which signals corresponding to lightnesses are stored in accordance with the order of the lightnesses; operating means for calculating an additive average value of the neighboring gray signal levels in a demodulation signal converted into the digital signal by the A/D converter; second storage means for sequentially storing the same storage content read out of the first storage means at the period corresponding to a conversion period of the A/D converter until the gray signal levels exceed the additive average value; and display means for displaying at the lightness according to the storage content read out of the second storage means by use of the output digital signal of the A/D converter as an address.

With the above features of the invention, the demodulation signal (hereinafter, also simply referred to as an image signal) obtained by demodulating the received image signal is converted into the digital signal by the A/D converter. The additive average value of the neighboring gray signal levels in the digital signal converted by the A/D converter is calculated by the operating means. Until the gray signal levels exceed the additive average value, the same storage content read out of the first storage means in which the signals corresponding to the lightnesses are stored in accordance with the order of the lightnesses is sequentially stored into the second storage means at the period corresponding to the conversion period of the A/D converting means. Therefore, the same storage content read out of the first storage means is stored into the second storage means for the gray signal level between the neighboring additive averaging values. The conversion table of the lightness for the output digital signal from the A/D converter is stored in the second storage means.

An address in the second storage means is designated by the digital signal derived by A/D converting the image signal which is supplied subsequently to the gray signal. The corresponding storage content, i.e., the lightness signal corresponding to the image signal is output from the second storage means and displayed by the display means at the lightness in accordance with the storage content read out.

Therefore, an amount of storage content which is stored into the first storage means can be reduced and the conversion table corresponding to the gray signal level in the image signal is made and stored into the second storage means in a realtime manner. This is substantially the same as that the accurate demodulation was performed and the optimum lightness conversion is executed.

DESCRIPTION OF THE PREFERRED EMBODIMENTS

Figure 1:
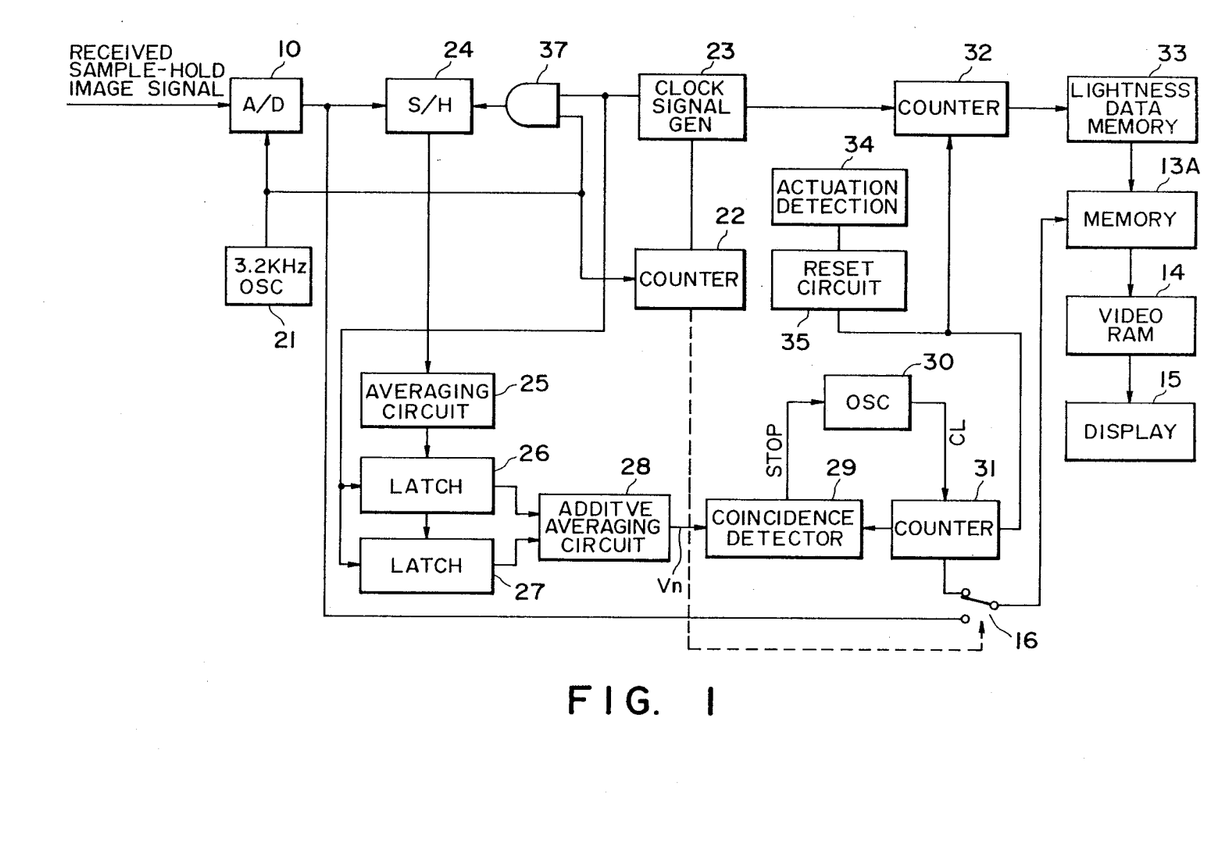
FIG. 1 is a block diagram showing a constitution of an embodiment of the present invention.

FIG. 1 is a block diagram showing the main section of an embodiment of the present invention.

The amplitude-frequency modulated FAX signal sent from a weather satellite is FM detected and further AM detected. The carrier signal is removed from this signal and sampled and held and then supplied to the A/D converter 10. An output of the A/D converter 10 is supplied as an address data to a memory 13A through switching means 16 during the image signal transmitting. Lightness data is read out of the memory 13A and stored into the video RAM 14 and displayed by the display 15. This constitution is similar to that of the conventional example shown in FIG. 8.

Figure 2A:
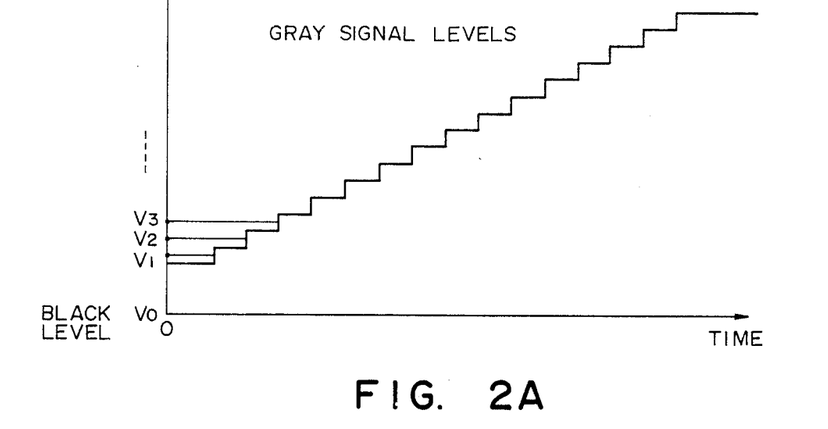
FIGS. 2A to 2C and 3A to 3C are diagrams for explaining the operation of one embodiment of the invention.
Figure 2B:
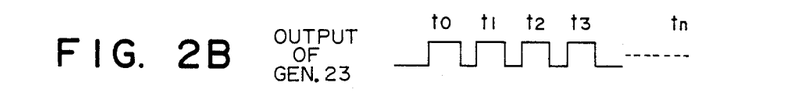
Figure 2C:
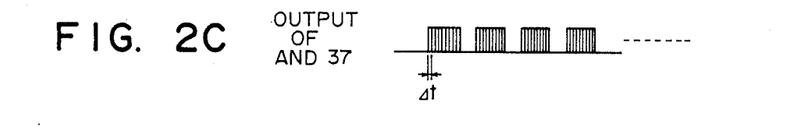

On the other hand, an output of an oscillator 21 is supplied to the A/D converter 10 and used as a clock signal for A/D conversion. Similarly, the output of the oscillator 21 is supplied to a counter 22 and counted. Pulse trains $t_0$, $t_1$, $t_2$, ... shown in FIG. 2B which are set to the high potential for a part of the period of time of each gray signal level shown in FIG. 2A are generated from a clock signal generator 23. The outputs of the generator 23 and oscillator 21 are supplied to an AND gate 37. For the period of time when each of the pulses $t_0$, $t_1$, ... is set to the high voltage, the output of the oscillator 21 is supplied as a sampling pulse to a sample/hold (S/H) circuit 24. The output of the A/D converter 10 is sampled and held by the S/H circuit 24. FIG. 2C shows a waveform of the sampling pulse of the S/H circuit 24. A width of pulse is set to $\Delta_t$. Gradations of the gray signal level are set to sixteen levels.

To remove the noises and the like included in the output of the S/H circuit 24 due to the pulses having the width of $\Delta_t$, the average value of two sampling values, at the same gray level is calculated by an averaging circuit 25. The reason why the average value is calculated in this manner is because there is a variation in S/N ratio in each value at every period of time of $\Delta_t$ and is to more accurately obtain the average value (hereinafter, referred to as a threshold level) between neighboring gray signal levels, which will be explained hereinafter. The calculation to obtain the average value by the averaging circuit 25 may be also omitted in dependence on the S/N ratio.

A shift register is constituted by the clock signal generator 23 and latch circuits 26 and 27. The output of the averaging circuit 25 is supplied to the shift register. Outputs of the latch circuits 25 and 26 are supplied to an additive averaging circuit 28. A delay time corresponding to only one clock signal of the clock signal generator 23 exists between the outputs of the latch circuits 25 and 26. The output of the additive averaging circuit 28 is set to the average value of the neighboring gray signal levels and used as a threshold level. In this manner, the threshold levels $V_1$, $V_2$, ..., $V_n$ are obtained. The shift register consisting of the clock signal generator 23 and latch circuits 25 and 26 operates in response to the leading edge of the clock signal.

The output of the additive averaging circuit 28 is supplied to a coincidence detector 29. The coincidence between this output and a count value of a counter 31 which is obtained by counting oscillation clock signals CL from a clock signal oscillator 30 is detected by the coincidence detector 29. When the coincidence is detected, the oscillation of the oscillator 30 is stopped. Therefore, when the count value of the counter 31 is $V_n$ when the oscillation of the oscillator 30 is stopped, the threshold level at the stop of the next oscillation of the oscillator 30 is changed, e.g., from $V_n$ to $V_{n+1}$. The count value of the counter 31 is supplied as address data to the memory 13A through the switching means 16.

On the other hand, the trailing edge of the oscillation output from the generator 23 is counted up by a counter 32 to adjust the timing. The count value of the counter 32 is supplied as address data into a memory 33. Lightness data is preliminarily stored in the memory 33 in correspondence to the address data positions. Until the given address data is changed, the lightness data stored at the designated address positions is continuously output. The lightness data from the memory 33 is written into the memory 13A.

An actuation signal detecting circuit 34 detects an actuation signal existing in the beginning of the input transmission data and resets the counters 31 and 32 through a reset circuit 35 by the detection output. When the counter 2 has counted the signals of the first one line in the data of one picture plane, it switches the switching means 16 from the position shown in FIG. 1.

Figure 3A:
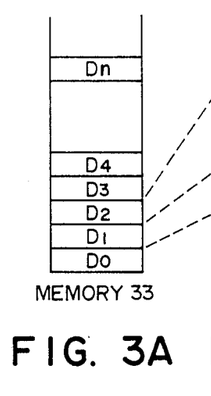
Figure 3B:
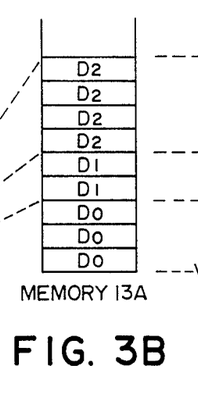
Figure 3C:
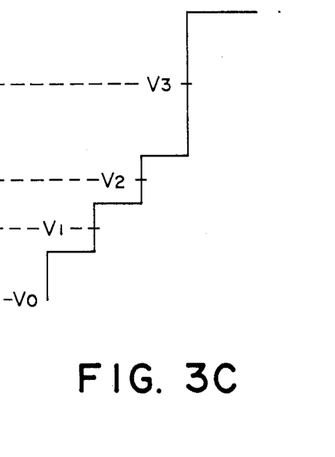

In the embodiment of the invention mentioned above, the lightness data stored in the memory 33 is stored into the memory 13A over one or more addresses during the counting operation of the counter 31. A conversion table is made in the memory 13A. Each time the threshold level is changed, the coincidence detector 29 detects the dissidence and the counter 31 restarts counting. Thus, the number of addresses in the memory 13A in which the same lightness data as the lightness data stored in the memory 33 is stored corresponds to the interval of the threshold levels. This is diagrammatically shown in FIGS. 3A to 3C. FIG. 3A shows the storage content of the memory 33. FIG. 3B shows the content of the lightness data stored in the memory 13A. FIG. 3C shows the gray signal levels. On the other hand, the number of gray signal level data is counted by the count value of the counter 22. After completion of the counting operation of one horizontal line, the switching means 16 is switched to the state shown in FIG. 1. The FAX signal which is subsequently input is converted into the lightness signal by the memory 13A.

Therefore, the lightness data in the memory 33 having a smaller capacity can be converted and stored into the memory 13A. At this time, the lightness data to be stored is changed by the threshold level between neighboring gray signal levels. Therefore, even when the image signal was changed by the change of the receiver's characteristics due to a temperature condition or the like, there is no need to adjust and the color can be easily adjusted.

In addition, since the gray signals of 22 lines exist in the data of one picture plane, the automatic adjustment can be performed as explained above by sacrificing only one of the 22 lines.

Another embodiment of the invention will now be described.

Figure 4:
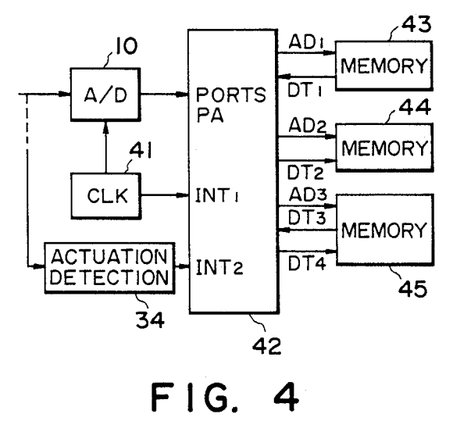
FIG. 4 is a block diagram showing a constitution of another embodiment of the invention.
Figure 5:
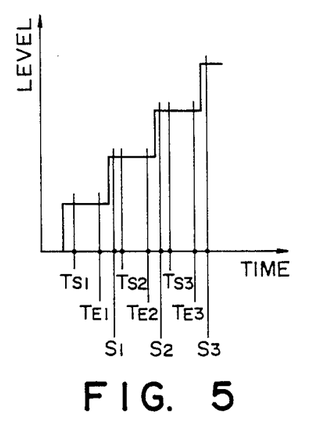
FIG. 5 is a diagram for explaining the operation of another embodiment of the invention.

FIG. 4 is a block diagram showing a constitution of another embodiment of the invention. Only the main section corresponding to the invention is shown. FIG. 5 shows a part of the gray signal levels shown in FIG. 2A.

In the embodiment of the invention shown in FIG. 4, reference numeral 42 denotes a microcomputer and 41 is a clock signal oscillator having an oscillating frequency of, e.g., 3.2 kHz. An oscillation output of the oscillator 41 is supplied to the A/D converter 10, thereby enabling the output to be obtained from the A/D converter 10 synchronously with the clock signal. Since one horizontal line of an image in the weather satellite corresponds to 250 msec, "800" data are obtained. On the other hand, the signal of 300 Hz is detected to actuate the microcomputer 42. Namely, it is supplied as a first interruption signal. In FIG. 4, the output of the A/D converter 10 is supplied to a port A of the microcomputer 42. On the other hand, the FAX signal from the weather satellite is supplied to the actuation signal detecting circuit 34 to detect the actuation signal in the FAX signal. The output of the detecting circuit 34 when the actuation signal was detected is supplied as a second interruption signal to the microcomputer 42.

In FIG. 4, the codes corresponding to the lightnesses of the displays are previously stored in a memory 43 in accordance with the order of the lightnesses. A memory 44 stores the conversion table so as to obtain the optimum lightness for the input level of the A/D converter 10. The memory 43 corresponds to the memory 33 in FIG. 1. The memory 44 corresponds to the memory 13A in FIG. 1. A memory 45 is a memory for temporary storage in order to average twenty-two gray signal levels a few times.

Figure 6:
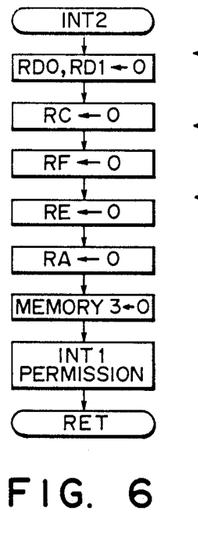
FIG. 6, 7A and 7B are flowcharts for explaining the operation of another embodiment of the invention.

When an actuation signal is output from the detecting circuit 34, i.e., when the second interruption signal is input, the interruption is performed and as shown in FIG. 6, temporary registers RA to RG are initialized and the memory 45 is cleared. The data regarding $S_n$, which will be explained hereinlater, is registered into the register RA. The storage contents of the memories 43 and 45 are registered into the registers RB and RG. The number of data (the maximum value is "800" in this example) of one horizontal line of the FAX signal is registered into the register RC. The output of the A/D converter 10 is registered into the registers $RD_0$ and $RD_1$. The address in the memory 44 is registered into the register RE. The number of transmission times (the maximum value is "22" in this example) of the gray signal lines is registered into the register RF.

Figure 7A:
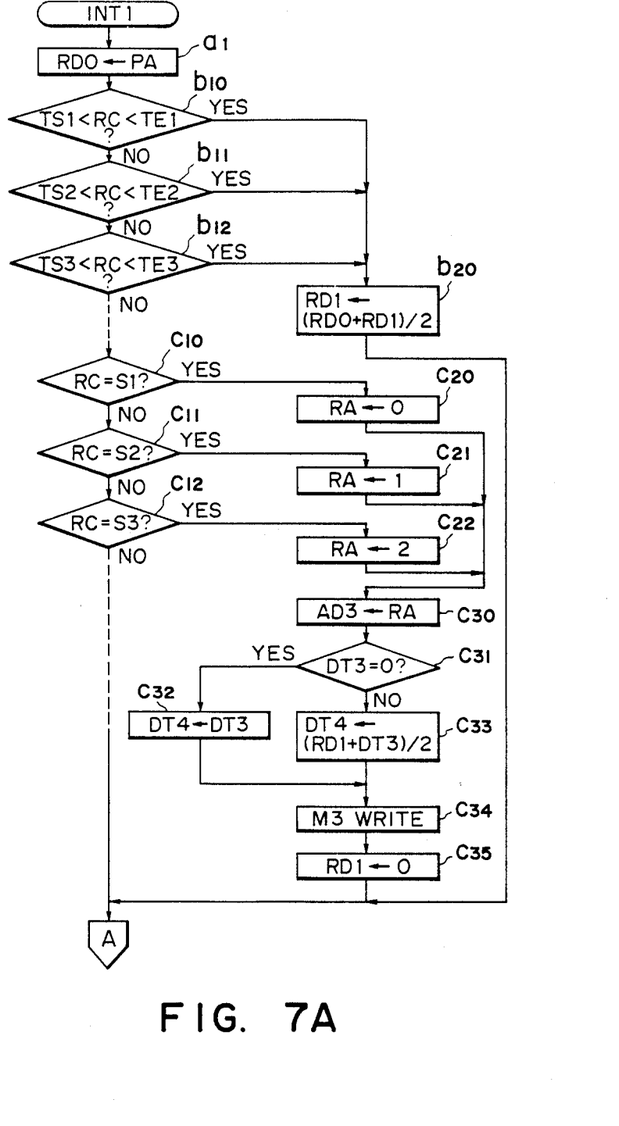
Figure 7B:
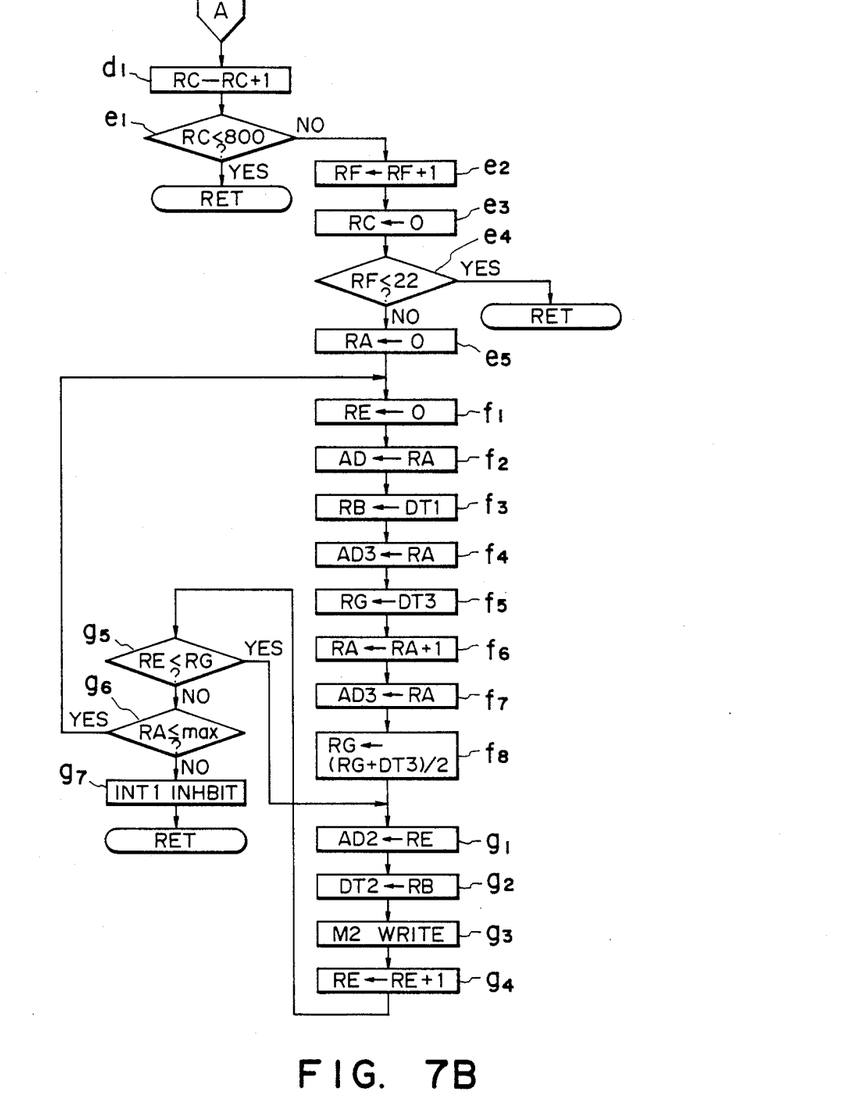

When the first interruption signal is supplied to the microcomputer 42, the processes according to flowcharts shown in FIGS. 7A and 7B are executed. FIGS. 7A and 7B show the processes until the conversion table is made. The processes concerned with the sections of the video RAM 14 and subsequent components in the embodiment of the invention are omitted.

(A) The output of the A/D converter 10 is input to the port A of the microcomputer 42 and registered into the register $RD_0$ (step $a_1$)

(B) A check is made to see if the content of the register RC falls within a range between $T_{Sn}$ and $T_{En}$ as shown in FIG. 5 or not (steps $b_{10}, b_{11}, b_{12}, \ldots$). If YES, the additive average value of the contents of the registers $RD_0$ and $RD_1$ is calculated and registered into the register $RD_1$ (step $b_{20}$). After step $b_{20}$, the processes in step D, which will be explained hereinlater, are executed. In steps $b_{10}, b_{11}, b_{12}, \ldots$, and $b_{20}$, the processes similar to those which are executed in the averaging circuit 25 in the embodiment of the invention are executed.

(C) If the value of the register RC is out of the range between $T_{Sn}$ and $T_{En}$, a check is made to see if the content of the register RC is $S_1, S_2, \ldots$ as shown in FIG. 5 or not (steps $C_{10}, C_{11}, C_{12}, \ldots$) In this case, $S_1$ denotes a timing which was set between $T_{E1}$ and $T_{S2}$. $S_2$ is also a timing which was set between $T_{E2}$ and $T_{S3}$. The same shall apply to $S_3, \ldots S_1, S_2, \ldots$ may be close to the gradations $T_{S2}, T_{S3}, \ldots$ or $T_{E1}, T_{E2}, \ldots$ shown in FIG. 5.

If the content of the register RC is $S_n$, $(n-1)$ is registered into the register RA (steps $C_{20}, C_{21}, C_{22}, \ldots$). The content of the register RA is supplied as address data to the memory 45 and the storage content ($DT_3$) of the memory 45 is read out (step $C_{30}$). A check is made to see if the readout storage content ($DT_3$) is zero or not (step $C_{31}$). If YES, "0" is stored as the content ($DT_4$) into the memory 45 (steps $C_{32}$ and $C_{34}$). If it is not zero, the additive average value of the content of the register $RD_1$ and the storage content ($DT_3$) is calculated and stored as the content ($DT_4$) into the memory 45 (steps $C_{33}$ and $C_{34}$). Next, the content of the register $RD_1$ is registered to 0 (step $C_{35}$). The average value in the sub scanning direction of each of the (twenty-two) gray signal lines is calculated in steps (F) and (G), which will be explained hereinafter.

(D) If the content of the register RC is not the value corresponding to $S_{16}$ as the result of the discrimination in step $b_{20}, C_{35}$, or $C_{12}, \ldots$, "1" is added to the content of the register RC (step $d_1$).

(E) After step $d_1$, a check is made to see if the content of the register RC has exceeded "800" or not (step $e_1$). If NO, "1" is added to the content of the register RF (step $e_2$). Then, the content of the register RC is set to 0 (step $e_3$).

Next, a check is made to see if the content of the register RF has exceeded "22" or not (step $e_4$). If NO, 0 is registered into the register RA (step $e_5$).

(F) After step $e_5$, 0 is registered into the register RE (step $f_1$). An address in the memory 43 is designated in accordance with the content of the register RA (step $f_2$). The readout storage content ($DT_1$) of the memory 43 is registered into the register RB (step $f_3$). An address in the memory 45 is designated in accordance with the content of the register RA (step $f_4$). The readout storage content ($DT_3$) of the memory 45 is registered into the register RG (step $f_5$). After step $f_5$, "1" is added to the content of the register RA (step $f_6$). An address in the memory 45 is designated in accordance with the content of the register RA (step $f_7$). The additive average value of the readout storage content ($DT_3$) of the memory 45 and the content of the register RG is calculated and registered into the register RG (step $f_8$). Therefore, by execution of the processes in steps $f_5$ to $f_8$, the operation which is equivalent to that of the additive averaging circuit 28 in the embodiment of the invention is realized.

(G) After step $f_8$, an address in the memory 44 is designated in accordance with the content of the register RE (step $g_1$). The content of the register RB is written into the address designated in step $g_1$ (step $g_2$ and $g_3$). Next, "1" is added to the content of the register RE (step $g_4$). A check is made to see if the content of the register RG is larger than the content of the register RE or not (step $g_5$). The processes in steps $g_1$ to $g_5$ are executed for the period of time when the content of the register RG is larger than the content of the register RE. Therefore, by execution of the processes in steps $g_1$ to $g_5$, the same operations as those of the coincidence detector 29, clock signal oscillator 30, and counter 31 in the embodiment of the invention are executed.

If the content of the register RG is larger than the content of the register RE in step $g_5$, a check is then made in step $g_6$ to see if the content of the register RA is below the maximum value of the lightness or not. If it is below the maximum value of the lightness, the processing routine is returned to step $f_1$. If the content of the register RA is above the maximum value of the lightness in step g₆, the first interruption is inhibited (step g₇). The processing routine is returned to the main routine.

On the other hand, if the content of the register RC is larger than "800" in step e₁ and when the content of the register RF is larger than "22" in step e₄, the processing routine is returned to the main routine.

As mentioned above, the number of gray signals is set to "800" for one horizontal line and the gray signals are transmitted with respect to twenty-two horizontal lines. Therefore, according to this embodiment of the invention, the memory 44, i.e., the conversion table can be made by use of all of the gray signals of twenty-two horizontal lines. In this case, the memory 45 is provided and each value of the gray signals is temporarily stored into the memory 45, and the average value in the sub scanning direction is calculated by repeating the temporary storage twenty-two times. A conversion table can be made using this average value.

As described above, according to the present invention, the conversion table to convert the FAX signal into the lightness data is automatically made. At this time, the lightness signals are classified by use of, e.g., the additive average value of the neighboring gray signal levels in the input image signal as a threshold level. Therefore, it is sufficient to roughly adjust the input FAX signal and there is no need to finely adjust it. This is equivalent to that the accurate adjustment is substantially performed without a complicated operation of the user. On the other hand, there is an effect such that the adjustment is performed in a realtime manner by the input FAX signal.

Further, even for the noises which are mixed into the input FAX signal due to the weather condition or the like, since the lightness change position of the conversion table is the position of the additive average value of, for example, the neighboring gray signal levels. Thus, a strong and clear image is obtained and the weather condition can be accurately discriminated.

On the other hand, there is also an effect such that it is also possible to correct the nonlinear distortions by the weather satellite, system of the weather satellite center, and the other transmission systems.

We claim:

1. Apparatus for reproducing an image from an image signal, including a reference gray signal and an image information signal, the apparatus comprising:

means for receiving the image signal;

memory means (e.g., 13A) including a plurality of store locations, each location being addressed by an address number which corresponds to the amplitude of an input signal;

means (e.g., 26, 27, 28) for generating a series of average values where each average value is the average between one of the levels of the gray signal and the level of the gray signal adjacent to said one level;

means (e.g., 29, 30, 31, 32, 33) for writing into said memory means data corresponding to the lightness value of the image signal where equal values of the lightest value data are written into those memory locations which correspond to amplitudes of the input signal occurring between one of said average values and the average value subsequent to said one average value;

means (e.g., 16) for addressing said memory means by applying the received image information signal as the input signal to said memory means to read out the lightness value data stored at the addressed locations.

2. Apparatus as in claim 1 were the number of said equal values of the lightness value data written into said memory means is a function of the difference between said one average value and said subsequent average value.

3. Apparatus according to claim 1, wherein said reference gray signal comprises a plurality of lines where one of said lines of the reference gray signal is used to generate said series of average values.

4. Apparatus according to claim 1 further comprising a video RAM (e.g., 14) for storing the lightness value data read out from said memory.

5. Apparatus for reproducing an image from an image signal including a reference gray and an image information signal, the apparatus comprising:

means for receiving the image signal;

means for converting amplitudes of the received image signal into corresponding address numbers;

memory means including a plurality of store locations, each location being addressed by said address numbers;

means for writing a lightness value for each level of the reference gray signal into said store locations addressed by the address numbers converted from the amplitudes of the received reference gray signal when receiving at least part of the reference gray signal.

* * * * *